US011973875B2

(12) United States Patent
Perkins et al.

(10) Patent No.: US 11,973,875 B2
(45) Date of Patent: Apr. 30, 2024

(54) COMPUTER SYSTEMS AND COMPUTER-IMPLEMENTED METHODS UTILIZING DIGITAL RESOURCE ACCESSING MECHANISM SCHEMA FOR DIGITAL TOKENS

(71) Applicant: BYT, INC., Miami, FL (US)

(72) Inventors: Williams Perkins, Miami, FL (US); Kaleb Phillips, Miami, FL (US); Tanner Larsson, Miami, FL (US); Suraj Pai, Miami, FL (US)

(73) Assignee: BYT, INC., Miami, FL (US)

( * ) Notice: Subject to any disclaimer, the term of this patent is extended or adjusted under 35 U.S.C. 154(b) by 0 days.

(21) Appl. No.: 18/375,400

(22) Filed: Sep. 29, 2023

(65) Prior Publication Data

US 2024/0113883 A1    Apr. 4, 2024

Related U.S. Application Data

(60) Provisional application No. 63/377,674, filed on Sep. 29, 2022.

(51) Int. Cl.
*H04L 9/40* (2022.01)
*H04L 9/00* (2022.01)
*H04L 9/32* (2006.01)

(52) U.S. Cl.
CPC .............. *H04L 9/3213* (2013.01); *H04L 9/50* (2022.05)

(58) Field of Classification Search
CPC .............................. H04L 9/3213; H04L 9/50
See application file for complete search history.

(56) References Cited

U.S. PATENT DOCUMENTS

| | | | |
|---|---|---|---|
| 9,588,960 B2 * | 3/2017 | Nekhay | G06F 40/30 |
| 10,325,076 B2 * | 6/2019 | Sardesai | H04L 67/1097 |
| 11,012,495 B1 * | 5/2021 | Vakalapudi | H04L 9/3263 |
| 2003/0200436 A1 * | 10/2003 | Eun | G06F 21/6209 726/19 |
| 2007/0112738 A1 * | 5/2007 | Livaditis | G06F 16/245 |
| 2019/0165942 A1 * | 5/2019 | Subramaniam | H04M 17/10 |
| 2020/0311299 A1 * | 10/2020 | Amar | G06F 21/62 |
| 2021/0357927 A1 * | 11/2021 | Kita | G06Q 20/38215 |
| 2022/0198031 A1 * | 6/2022 | Yuan | G06F 21/6209 |

* cited by examiner

*Primary Examiner* — Ghodrat Jamshidi
(74) *Attorney, Agent, or Firm* — Greenberg Traurig, LLP (57) ABSTRACT

Systems and methods of the present disclosure establish a connection with a distributed data network configured to maintain token-holding data structures storing digital tokens for users utilizing client devices. One or more first digital tokens may be accessed, where the first digital tokens are maintained by a first token-holding data structure associated with a first user. The first user may utilize a first client device to access the distributed data network. The first digital tokens may be parsed to identify attributes of the first digital tokens and access to one or more computing resources is assigned to the first client device based on the one or more attributes.

18 Claims, 4 Drawing Sheets

COMPUTER SYSTEMS AND COMPUTER-IMPLEMENTED METHODS UTILIZING DIGITAL RESOURCE ACCESSING MECHANISM SCHEMA FOR DIGITAL TOKENS

CROSS REFERENCE TO RELATED APPLICATIONS

This application is a continuation of and claims priority from U.S. Provisional Application No. 63/377,674, filed Sep. 29, 2022, entitled: COMPUTER SYSTEMS AND COMPUTER-IMPLEMENTED METHODS UTILIZING DIGITAL RESOURCE ACCESSING MECHANISM FOR DIGITAL TOKENS, which is hereby incorporated by reference.

FIELD OF THE DISCLOSURE

Generally, the present disclosure is directed to computer-implemented methods and computer systems configured for a digital resource accessing mechanism (e.g., validation) for one or more digital tokens (e.g., NFTs).

BACKGROUND

Managing NFTs may be technologically difficult because NFTs have many unique traits, but it may be difficult to identify these traits to organize NFTs.

SUMMARY

In some aspects, the techniques described herein relate to a method including: establishing, by at least one processor, a connection with a distributed data network; wherein the distributed data network includes a plurality of client devices associated with a plurality of users; wherein the plurality of client devices are associated with a plurality of token-holding data structures storing a plurality of digital tokens for the plurality of users in accordance with at least one data schema; accessing, by the at least one processor, a first token-holding data structure associated with a first user of the plurality of users, the first token-holding data structure storing one or more first digital tokens from the plurality of digital tokens; wherein the first user utilizes a first client device to access the distributed data network; parsing, by the at least one processor, the one or more first digital tokens to identify one or more attributes of the one or more first digital tokens; and determining, by the at least one processor, at least one access permission criteria provided by at least one computing resource; wherein the at least one access permission criteria includes at least one required attribute to be validated for access to the at least one computing resource; assigning, by the at least one processor, based at least in part on the one or more attributes meeting the at least one access permission criteria, access to one or more computing resources to the first client device to enable the first user to access the one or more computing resources via the first client device.

In some aspects, the techniques described herein relate to a method, further including: requesting, by the processor, from a first token-holding data structure provider associated with the first token-holding data structure, authentication information for access to the first token-holding data structure; receiving, by the processor, from the first token-holding data structure provider, authentication information including the at least one first token-holding data structure attribute of the first token-holding data structure; authenticating, by the processor, the first user as an owner of the first token-holding data structure based on the authentication information; and establishing, by the processor, a link to the first token-holding data structure based on the authenticating to enable the accessing of the accessing, by the at least one processor, of the first token-holding data structure.

In some aspects, the techniques described herein relate to a method, wherein the link includes a persistent authentication with the first token-holding data structure to enable access to the first token-holding data structure without another authentication message.

In some aspects, the techniques described herein relate to a method, wherein the first token-holding data structure includes a first blockchain wallet.

In some aspects, the techniques described herein relate to a method, wherein the at least one access permission criteria includes a threshold number of digital tokens; and wherein the one or more attributes of the one or more first digital tokens includes a number of the one or more first digital tokens.

In some aspects, the techniques described herein relate to a method, further including: determining, by the at least one processor, a media type of the one or more first digital tokens; wherein the at least one access permission criteria includes a required media type of digital tokens.

In some aspects, the techniques described herein relate to a method, further including: accessing, by the at least one processor, at least one image associated with the one or more first digital tokens; determining, by the at least one processor, at least one derived trait of content of the at least one image; and identifying, by the at least one processor, the one or more attributes as the at least one derived trait.

In some aspects, the techniques described herein relate to a method, wherein the at least one derived trait includes at least one trait of a person captured in the at least one image.

In some aspects, the techniques described herein relate to a method, wherein the at least one trait of the person includes at least one of: rarity, hair color, a presence of a hat, or an identifier of the person, In some aspects, the techniques described herein relate to a method, wherein the one or more attributes includes an amount of the one or more first digital tokens.

In some aspects, the techniques described herein relate to a system including: at least one processor that, upon execution of software instructions, is configured to: establish a connection with a distributed data network; wherein the distributed data network includes a plurality of client devices associated with a plurality of users; wherein the plurality of client devices are associated with a plurality of token-holding data structures storing a plurality of digital tokens for the plurality of users in accordance with at least one data schema; access a first token-holding data structure associated with a first user of the plurality of users, the first token-holding data structure storing one or more first digital tokens from the plurality of digital tokens; wherein the first user utilizes a first client device to access the distributed data network; parse the one or more first digital tokens to identify one or more attributes of the one or more first digital tokens; and determine at least one access permission criteria provided by at least one computing resource; wherein the at least one access permission criteria includes at least one required attribute to be validated for access to the at least one computing resource; assign based at least in part on the one or more attributes meeting the at least one access permission criteria, access to one or more computing resources to the first client device to enable the first user to access the one or more computing resources via the first client device.

In some aspects, the techniques described herein relate to a system, wherein the at least one processor is further configured to: requesting, by the processor, from a first token-holding data structure provider associated with the first token-holding data structure, authentication information for access to the first token-holding data structure; receiving, by the processor, from the first token-holding data structure provider, authentication information including the at least one first token-holding data structure attribute of the first token-holding data structure; authenticating, by the processor, the first user as an owner of the first token-holding data structure based on the authentication information; and establishing, by the processor, a link to the first token-holding data structure based on the authenticating to enable the accessing of the access of the first token-holding data structure.

In some aspects, the techniques described herein relate to a system, wherein the link includes a persistent authentication with the first token-holding data structure to enable access to the first token-holding data structure without another authentication message.

In some aspects, the techniques described herein relate to a system, wherein the first token-holding data structure includes a first blockchain wallet.

In some aspects, the techniques described herein relate to a system, wherein the at least one access permission criteria includes a threshold number of digital tokens; and wherein the one or more attributes of the one or more first digital tokens includes a number of the one or more first digital tokens.

In some aspects, the techniques described herein relate to a system, wherein the at least one processor is further configured to: determine a media type of the one or more first digital tokens; wherein the at least one access permission criteria includes a required media type of digital tokens.

In some aspects, the techniques described herein relate to a system, wherein the at least one processor is further configured to: access at least one image associated with the one or more first digital tokens; determine at least one derived trait of content of the at least one image; and identify the one or more attributes as the at least one derived trait.

In some aspects, the techniques described herein relate to a system, wherein the at least one derived trait includes at least one trait of a person captured in the at least one image.

In some aspects, the techniques described herein relate to a system, wherein the at least one trait of the person includes at least one of: rarity, hair color, a presence of a hat, or an identifier of the person, In some aspects, the techniques described herein relate to a system, wherein the one or more attributes includes an amount of the one or more first digital tokens.

BRIEF DESCRIPTION OF THE DRAWINGS

Embodiments of the present disclosure, briefly summarized above and discussed in greater detail below, may be understood by reference to the illustrative embodiments of the disclosure depicted in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. The figures are not drawn to scale and may be simplified representations for the sake of clarity. It is contemplated that elements and features of one embodiment may be beneficially incorporated in other embodiments without further recitation.

DETAILED DESCRIPTION

Among those benefits and technical solutions that have been disclosed, other objects and advantages of this disclosure may become apparent from the following description taken in conjunction with the accompanying figures. Detailed embodiments of the present disclosure are disclosed herein; however, it is to be understood that the disclosed embodiments are merely illustrative of the disclosure that may be embodied in various forms. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although they may. Thus, as described below, various embodiments of the disclosure may be readily combined, without departing from the scope or spirit of the disclosure. Further, when a particular feature, structure, or characteristic is described in connection with an implementation, it is submitted within the knowledge of one skilled in the art to effect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 1:
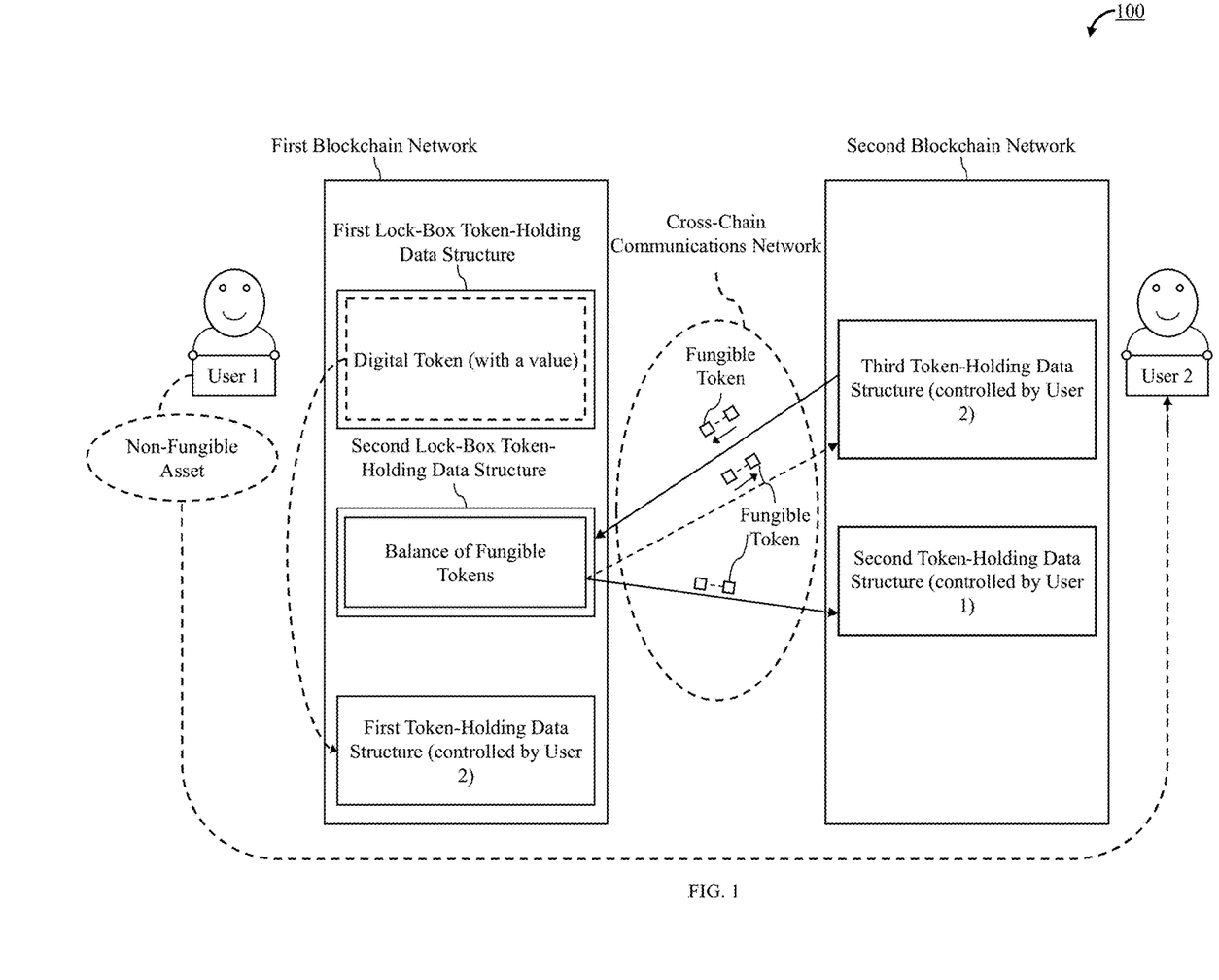
FIGS. 1-4 are representative of some exemplary aspects of the present disclosure in accordance with at least some principles of at least some embodiments of the present disclosure.

Now referring to FIG. 1, a blockchain system 100 may be a system of recording information in a way that makes it difficult or impossible to change, hack, or cheat the system, by utilizing immutable data records. The blockchain may be a digital ledger of transactions that may be duplicated and distributed across the entire network of computer systems on the blockchain. In some embodiments, the blockchain is a public blockchain in which any client device is allowed to join and participate in the blockchain network. In some embodiments the blockchain is a private blockchain in which only selected and verified client devices allowed to join and participate in the blockchain network. An administrator of the private blockchain has the right to override, edit, or delete entries on the blockchain. In some embodiments the blockchain is a permissioned blockchain that has functionality of both private and public blockchains. An administrator of the private blockchain has the right to allocate different permissions to different client devices on the network.

In some embodiments, the exemplary inventive computer-based systems/platforms, the exemplary inventive computer-based devices, and/or the exemplary inventive computer-based components of the present disclosure may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that may be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that may be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

The blockchain system may include digital tokens, which may be non-fungible token (NFT) that are unique digital assets that may be secured and contained on a blockchain. NFTs having a data schema forming unique cryptographic tokens that exist on a blockchain and cannot be replicated. NFTs may represent digital and/or physical assets that have been tokenized via a blockchain, assigned unique identification codes and metadata that distinguish the assets from other tokens. NFTs may represent digital or real-world items like artwork and real estate. "Tokenizing" real-world tangible assets makes buying, selling, and trading them more efficient while reducing the probability of fraud. In some embodiments, NFTs may be built following the ERC-721 (Ethereum Request for Comment #721) standard, which dictates how ownership is transferred, methods for confirming transactions, and how applications handle safe transfers. NFTs may be easily created. NFTs may contain references to digital files such as photos, videos, and audio. Because NFTs are uniquely identifiable assets, they differ from cryptocurrencies, which are fungible. For example, the NFT may be a record on a blockchain that is associated with a particular digital or physical asset. For example, traditional works of art such as paintings may be valuable because they are one of a kind. However, digital files may be easily and endlessly duplicated. With NFTs, artwork may be "tokenized" to create a digital certificate of ownership that may be bought and sold.

Minting may be a process to create NFTs. On some blockchain networks, a command may be run to create the NFT as an immutable record, providing it with a unique hash that contains all of the metadata. The metadata may store key contextual information about the NFT, like its current ownership and transaction history. Marketplaces may allow users to view their NFT collection and NFTs in other collections. Each blockchain may include its own set of tools to view transaction data and minting information.

The blockchain system 100 may verify ownership, provenance, and transaction history of tokens such as cryptocurrency tokens and/or NFTs. For example, the ownership of an NFT is recorded in the blockchain, and may be transferred by the owner, allowing NFTs to be sold and traded. For example, as shown in FIG. 1, User 1 may sell an NFT to User 2, and the transaction may be recorded in the blockchain.

The blockchain system 100 may include one or more token-holding data structures. For example, a token-holding data structure may be a crypto wallet where a user may view cryptocurrency assets and transactions. The wallets may have different features. For example, the wallet may display NFTs on a smartphone or a desktop computer. The wallet may be protected with a 12-24 word 'seed phrase' that acts as the password to the wallet. A token-holding data structure, such as a wallet or crypto-wallet, enables users to manage, store, and trade their cryptocurrencies, NFTs and other blockchain-based tokens. It is a software that stores the record of transactions and also public and private keys which are used to perform transactions. The token-holding data structure may be accessed from web devices, including mobile ones, and the privacy and identity of the user are maintained. Transactions are secure, as they are cryptographically signed. Users may send a request to another party for a specific amount of bitcoin or other crypto-assets, and the system generates a unique address that may be sent to a third party or converted into a Quick Response code or QR code. A unique address is generated each time the user makes a request.

The blockchain system 100 may include one or more lock-box token-holding data structures. For example, lock-box token-holding data structure may be a digital wallet that was setup with digital protocol restricting the use and/or distribution of tokens based on one or more rules. In another example, the lock-box token-holding data structure is an escrow wallet. A user may use the escrow wallet to confirm any transactions of the digital tokens.

In some embodiments, a lock-box token-holding data structure may include a smart contract. The smart contract may be a self-executing contract with encoded terms of the agreement between the users and stored on the blockchain network. The code may be executed to control and cause transaction of tokens between the users.

However, managing NFTs may be technologically difficult because NFTs have many unique traits, but it may be difficult to identify these traits to organize NFTs. For example, certain NFT collections contain tokens where each has a variable array of traits. Validating the NFT itself inside a wallet may be different from identifying the traits within the NFT itself because without identifying the traits, it may be difficult to target specific metadata traits to allow for utilization to occur based on a specific token trait. For example, a user would have to manually identify traits of their NFTs to organize the NFTs, which would be a resource intensive process. However, traits are subjective and it would be difficult to identify which traits to analyze or look for. Moreover, it would be difficult for a user to organize different types of NFTs maintained in various wallets on various networks. Examples of traits for NFTs according to one or more embodiments are provided in Table 1 below:

TABLE 1

Exemplary NFT Traits

| NFT Type | Trait |
|---|---|
| General NFT | 1. tier: "bronze", "silver", "gold"<br>2. event_type: "concert", "workshop", "conference"<br>3. region: "NA", "EU", "ASIA"<br>4. duration: "1m", "6m", "12m"<br>5. content: "podcast", "ebook", "video"<br>6. edition: 1, 2, 3 . . .<br>7. role: "host", "speaker", "attendee"<br>8. time_slot: "day", "evening", "any"<br>9. issue_date: "2023-09-01", "2023-10-01"<br>10. expertise: "beginner", "intermediate", "advanced"<br>11. virtual_space: "world_A", "room_202"<br>12. points: 100, 500, 1000<br>13. merchandise: "shirt", "print", "signed_item"<br>14. age_group: "kids", "teens", "adults"<br>15. class_type: "yoga", "hiit", "zumba"<br>16. collaboration: "celebrity_A", "brand_B"<br>17. music_genre: "rock", "jazz", "pop"<br>18. art_style: "abstract", "realism"<br>19. viewing_type: "public", "private"<br>20. language: "EN", "ES", "CN"<br>21. avatar_style: "custom", "generic"<br>22. access_type: "early", "regular"<br>23. game_bonus: "level_up", "special_character"<br>24. content_format: "webinar", "tutorial", "course"<br>25. investment: "angel", "seriesA", "crowd"<br>26. size: "S", "M", "L"<br>27. edition_label: "collector", "regular"<br>28. chat_type: "celebrity", "expert"<br>29. feature: "standard", "extended", "bonus"<br>30. group: "club_A", "network_B"<br>31. environment: "forest", "beach", "city"<br>32. seat: "front_row", "balcony"<br>33. download_count: 1, 5, 10<br>34. diet: "vegan", "vegetarian", "gluten_free"<br>35. era: "80s", "renaissance", "futuristic"<br>36. subscription: "monthly", "quarterly"<br>37. loyalty: "new", "veteran"<br>38. quantity: 1, 50, 100<br>39. experience: "AR", "VR"<br>40. utility: "redeemable", "burnable"<br>41. vote: true, false<br>42. mystery_content: "A", "B", "random"<br>43. experience_level: "novice", "pro"<br>44. use_count: 1, 3, unlimited<br>45. room: "deluxe", "suite", "shared"<br>46. theme: "masquerade", "white_party"<br>47. collateral: 10, 50, 100<br>48. offset: "carbon_neutral", "tree_plant"<br>49. charity: "org_A", "org_B"<br>50. culture_event: "festival_A", "ceremony_B" |
| Event Ticketing | 1. event_name: "SummerFest2023", "RockConcertXYZ"<br>2. venue: "Madison Square Garden", "Local Amphitheater"<br>3. date: "2023-10-15", "2023-11-05"<br>4. time: "19:00", "21:30"<br>5. seat_section: "VIP", "General", "Balcony"<br>6. row_number: "A", "B", "C" . . .<br>7. seat_number: 1, 2, 3 . . .<br>8. artist: "BandName", "DJ XYZ" |

TABLE 1-continued

Exemplary NFT Traits

| NFT Type | Trait |
|---|---|
| | 9. genre: "rock", "electronic", "jazz" |
| | 10. age_restriction: "+18", "All Ages" |
| | 11. gate_number: "A1", "B2" |
| | 12. qr_code: (Unique QR code for quick scanning) |
| | 13. price_tier: "Early Bird", "Regular", "Last Minute" |
| | 14. backstage_access: true, false |
| | 15. meet_and_greet: true, false |
| | 16. merch_discount: "10%", "20%" |
| | 17. food_voucher_included: true, false |
| | 18. parking_pass: "VIP", "Standard", "None" |
| | 19. festival_day: "Day 1", "Day 2", "All Access" |
| | 20. camping_access: true, false |
| | 21. workshop_access: "Workshop A", "Workshop B", "None" |
| | 22. afterparty_invite: true, false |
| | 23. physical_ticket_option: true, false |
| | 24. commemorative_item: "Poster", "T-shirt", "None" |
| | 25. opening_act: "Artist A", "Artist B" |
| | 26. event_duration: "2 hours", "Full Day" |
| | 27. availability: "Sold Out", "Available", "Resale" |
| | 28. drinks_package: "Basic", "Premium", "Non-alcoholic" |
| | 29. vip_lounge_access: true, false |
| | 30. sponsor_promotions: "Sponsor A", "Sponsor B" |
| | 31. limited_edition: true, false |
| | 32. souvenir_included: "Badge", "Wristband" |
| | 33. sound_check_access: true, false |
| | 34. family_zone: true, false |
| | 35. disabled_access: true, false |
| | 36. translation_services: "Spanish", "French", "None" |
| | 37. fast_pass_entry: true, false |
| | 38. event_theme: "80s Retro", "Futuristic Glow" |
| | 39. upgrade_option: "Available", "Not Available" |
| | 40. refunds: "Available till X Date", "No Refunds" |
| | 41. transferable: true, false |
| | 42. swag_bag: true, false |
| | 43. wifi_access: "Free", "Paid", "None" |
| | 44. locker_rental: "Available", "Not Available" |
| | 45. photo_op: true, false |
| | 46. early_entry: true, false |
| | 47. sustainability: "Carbon Neutral Event", "Plastic-Free" |
| | 48. shuttle_service: "From City Center", "From Airport", "None" |
| | 49. guest_appearance: "Special Celebrity", "None" |
| | 50. interactive_session: "Q&A with Artist", "None" |
| Gaming | 1. level: 1, 2, 3 . . . (Character or weapon level) |
| | 2. hp: (Hit Points/Health) 100, 150, 200 . . . |
| | 3. attack_power: 10, 20, 30 . . . |
| | 4. defense_power: 5, 15, 25 . . . |
| | 5. speed: 10, 20, 30 . . . (Movement or attack speed) |
| | 6. element: "Fire", "Water", "Earth", "Air" |
| | 7. rarity: "Common", "Uncommon", "Rare", "Legendary" |
| | 8. skill_set: ["Slash", "Heal", "Invisibility"] |
| | 9. weapon_type: "Sword", "Bow", "Staff" |
| | 10. armor_type: "Plate", "Leather", "Robe" |
| | 11. experience_points: 100, 500, 1000 . . . |
| | 12. mana: 50, 100, 150 . . . (Magic or skill energy) |
| | 13. alignment: "Good", "Evil", "Neutral" |
| | 14. faction: "Alliance", "Horde", "Neutral" |
| | 15. currency_multiplier: 1×, 2×, 3× . . . (Earning rate of in-game currency) |
| | 16. special_ability: "Flight", "Teleportation", "Time Manipulation" |
| | 17. durability: 100, 90, 80 . . . (For weapons or armor) |
| | 18. ammo_type: "Arrows", "Bullets", "Magic Crystals" |
| | 19. range: "Short", "Medium", "Long" |
| | 20. cooldown: 10s, 30s, 60s . . . (Time to reuse skills or abilities) |
| | 21. race: "Elf", "Orc", "Human", "Cyborg" |
| | 22. class: "Warrior", "Mage", "Rogue", "Healer" |
| | 23. inventory_slots: 20, 30, 40 . . . (Number of items a character can carry) |
| | 24. upgrade_path: "Tier1", "Tier2", "Tier3" |
| | 25. crafted_by: "PlayerName", "NPC_X", "Guild_Y" |
| | 26. set_bonus: "Extra 10% Attack when complete set is worn" |
| | 27. resource_generation: 5, 10, 15 . . . (For resources like mana, energy) |
| | 28. critical_chance: "10%", "20%", "30%" . . . |
| | 29. loot_drop_rate: "Standard", "Enhanced", "Double" |
| | 30. tradeable: true, false |
| | 31. repair_cost: 10 gold, 20 gold, 1 diamond . . . |
| | 32. bind_type: "Bind on Pickup", "Bind on Equip", "Never Bind" |
| | 33. mount_compatibility: "All", "Ground Only", "Flying Only" |
| | 34. team_size: 1, 2, 4 . . . (If the NFT is a team or group token) |

TABLE 1-continued

Exemplary NFT Traits

| NFT Type | Trait |
|---|---|
| | 35. revive_ability: true, false |
| | 36. vision_range: "Short", "Medium", "Night Vision" |
| | 37. stealth_detection: true, false |
| | 38. socket_slots: 1, 2, 3 . . . (For embedding gems or enhancements) |
| | 39. audio_theme: "Epic", "Stealthy", "Mystical" |
| | 40. unlockable_story: "Origin Story", "Adventure Arc" |
| | 41. dual_wield: true, false (Ability to hold two weapons) |
| | 42. enchantable: true, false |
| | 43. skin_variants: ["Default", "Battle-Scarred", "Golden"] |
| | 44. companion_compatibility: "All", "None", "Specific Type" |
| | 45. energy_type: "Stamina", "Rage", "Mana" |
| | 46. voice_pack: "Heroic", "Sinister", "Robotic" |
| | 47. biome_affinity: "Forest", "Desert", "Cave", "City" |
| | 48. daily_reward_multiplier: 1×, 1.5×, 2× . . . |
| | 49. legacy_status: "Founder's Edition", "Alpha Release", "Event Exclusive" |
| | 50. realm_access: "Standard Realms", "VIP Realms", "All Realms" |

Figure 2:
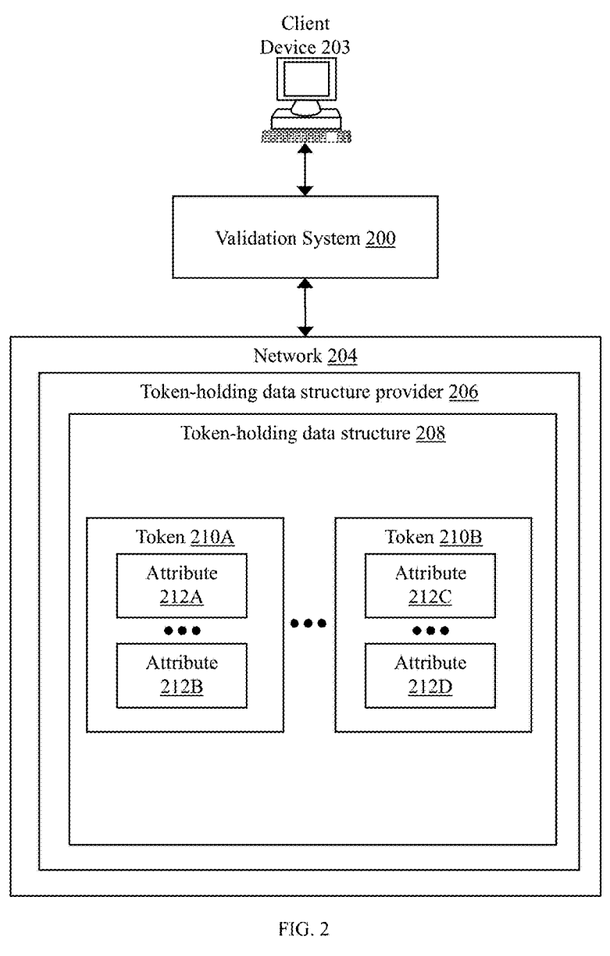

Now referring to FIG. 2, to provide technical solutions to these and other technological problems, the present disclosure includes a validation system 200 and methods for use thereof. In some embodiments, the validation system 200 may connect to a network 204. For example, the network 204 may be a blockchain network. The network 204 may include a token-holding data structure provider 206. For example, the token-holding data structure provider 206 may be a wallet provider. The token-holding data structure provider may maintain a token-holding data structure 208. For example, the token-holding data structure 208 may be a wallet for storing cryptocurrency assets and transactions.

The token-holding data structure 208 may maintain one or more digital tokens 210A-210B. For example, the one or more digital tokens 210A-210B may be NFTs. The digital tokens 210A-210B may be maintained according to one or more data schemas in the network 204 and in the token-holding data structure provider 206. For example, the NFTs live on the blockchain network and are in the user's wallet. Each of the one or more digital tokens 210A-210B may have a structure, such as a data schema, (e.g., ERC721 or 1155) with elements such as name, media (e.g., Image/Animation), and one or more metadata attributes 212A-212D. The one or more metadata attributes 212A-212D may be traits of the one or more digital tokens 210A-210B. The one or more metadata attributes 212A-212D may include a trait type or a trait value. In some embodiments, the one or more metadata attributes 212A-212D may include image, video, description, number values. Derivates of the one or more metadata attributes 212A-212D may include rarity, hair color, hats, identifiers, and amounts. For example, the one or more digital tokens 210A-210B may include an NFT-based event ticket for an event such as a performance, show, conference, seminar, sporting event, or other ticketed event. The one or more digital tokens 210A-210B including the NFT-based event ticket may include attributes such as ticket rarity, ticket color, an article of clothing or other merchandise included with the NFT-based event ticket, a location of an event, a time of the event, an artist name performing at the event, or ticket tier associated with the event, or other event and/or ticket attributes or any combination thereof.

The validation system 200 may validate or identify the metadata attributes 212A-212D of each of the one or more digital tokens 210A-210B to allow for extendable functionality based on the metadata attributes 212A-212D. The validation system 200 may include a validation mechanism, e.g., including a data schema that may be applied to the one or more digital tokens 210A-210B (e.g., NFT collection) to identify the one or more metadata attributes 212A-212D. In some embodiments, the validation mechanism may identify a unique trait or custom combination of traits and provide custom utilization to the client device 103 that owns the digital token.

From the synergistic combination of these technologies and platforms, the validation system 200 may overcome numerous technical challenges and includes numerous technical solutions.

One technical solution provided by the validation system 200 is that users of the client device 203 may organize the one or more digital tokens 210A-210B based on their attributes 212A-212D. Another technical solution provided by the validation system 200 is that by organizing the one or more digital tokens 210A-210B, the validation system 200 may provide the client device 203 with access to computing resources based on the attributes 212A-212D. Examples of computing resource may include online classes, discord roles with channel access, or future mint access. For example, the validation system 200 may identify users who are considered "elite citizens" and gives them special, private access to discord channels that the general public and other, normal owners of digital tokens 210A-210B cannot see.

Figure 3:
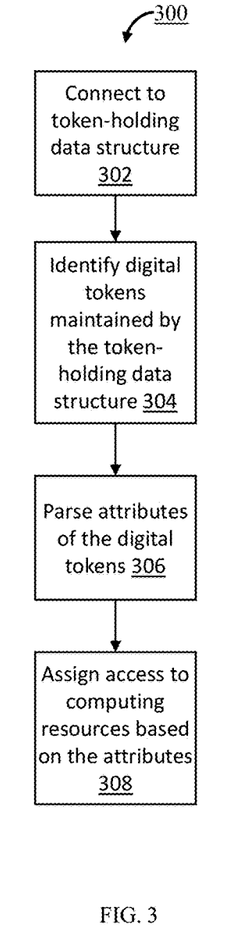

Now referring to FIG. 3, shown is a method 300 for digital resources accessing mechanisms for digital tokens, including digital resource access schema(s). In STEP 302, the validation system 200 may connect to a token-holding data structure 208. In some embodiments, the validation system 200 may retrieve communication information for communicating with the selected token-holding data structure 208. In some embodiments, the validation system 200 may verify a relationship of (e.g., ownership of) the client device 103 to the token-holding data structure 208. For example, after a user has connected their wallet to the validation system 200, the user should prove ownership of the wallet. If the validation system 200 only has the wallet address of the wallet, then the validation system 200 cannot definitely prove ownership of the wallet. For example, the user could have "spoofed" the wallet.

In some embodiments, the validation system 200 may display an interface 202 with a request for the user to verify a relationship to (e.g., ownership of) the token-holding data structure 208. In some embodiments, the validation system 200 may request authentication information to validate or verify the relationship to the token-holding data structure 208. For example, the authentication information may be a message. In some embodiments, the validation system 200 may request authentication information from the token-holding data structures provider 206 or the token-holding data structure 208. In some embodiments, the validation system 200 may request a cryptographically signed message from the token-holding data structures provider 206 and the token-holding data structure 208. For example, to prove ownership of the wallet, the validation system 200 may prompt the user to cryptographically sign the message using the wallet provider and wallet they had connected to in the previous step.

The user may cause the wallet provider to sign the message using the wallet's private key and hash the message. In some embodiments, the validation system 200 may cause the token-holding data structures provider 206 to sign the message based on an identifier of the token-holding data structure 208. In some embodiments, the validation system 200 may cause the token-holding data structure provider 206 to hash the message.

In some embodiments, the validation system 200 may receive the authentication information for verifying the relationship to the token-holding data structure 208. In some embodiments, the validation system 200 may receive the authentication information from the token-holding data structures provider 206. In some embodiments, the authentication information may be a cryptographically signed message from the token-holding data structures provider 206 or the token-holding data structure 208 selected by the user and connected to by the validation system 200.

The validation system 200 may analyze the authentication information. In some embodiments, the validation system 200 may identify that the authentication information is signed using the token-holding data structure 208. For example, the validation system 200 may identify that the message is signed using the wallet's private key and hashed. In some embodiments, the validation system 200 may decrypt the authentication information. For example, the validation system 200 may decrypt the message to identify that the message is signed using the wallet's private key and hashed. In some embodiments, the validation system 200 may decrypt the authentication information to identify that the authentication information includes a password or key. For example, the validation system 200 may identify that the message includes an address of the wallet.

By decrypting the authentication information, the validation system 200 may generate a comparison between the decrypted authentication information and the information about the token-holding data structure 208. If the validation system 200 identifies or confirms a match between the decrypted authentication information and the information, then the validation system 200 may verifying the user's relationship to the token-holding data structure 208. For example, if the validation system 200 decrypts the message, then the validation system 200 may identify the user's wallet address and confirm that it matches, which means that the user is indeed the owner of the wallet.

In some embodiments, the validation system 200 may create a link to the token-holding data structure 208 based on verification of the ownership. The link may be configured for access upon subsequent logins to an account of the user on the validation system 200. In some embodiments, the link may include persistent access rights of the account to the token-holding data structure 208 based on the verification of the user's relationship to the token-holding data structure 208 detailed above. Accordingly, the account may provide access to the one or more token-holding data structure 208 upon a subsequent login to the account without a need to authenticate with the token-holding data structure 208 itself.

In STEP 304, the validation system 200 may identify the digital tokens 210A-210B maintained by the token-holding data structure 208. In some embodiments, the validation system 200 may use verification information to access the token-holding data structure 208 to identify the digital tokens 210A-210B stored therein. In some embodiments, after proving the relationship of the token-holding data structure 208, the validation system 200 may analyze the digital tokens 210A-210B we look for the necessary assets (NFTs) in that wallet. For example, after proving ownership of the value (and hence the containing assets) in the wallet, the validation system 200 may analyze the necessary assets (e.g., ERC20 coins or NFTs) in that wallet. The validation system 200 may analyze the assets to identify the transaction history, wallet balances of any coin, or ENS name (e.g., domain name associated with the wallet).

In some embodiments, the validation system 200 may search for certain digital tokens 210A-210B in the token-holding data structure 208. In some embodiments, the validation system 200 may enable permissioning of the client device 203 for access to one or more computing resources based on the certain digital tokens 210A-210B. The computing resource(s) may advertise, broadcast, deliver or otherwise provide permissioning criteria to the validation system 200 so that the validation system 200 may test the certain digital tokens 210A-210B against the permissioning criteria. Where the certain digital tokens 210A-210B satisfy the criteria of the computing resource(s), the validation system 200 may validate the certain digital tokens 210A-210B, and thus the token-holding data structure 208 and associated client device 203, to permission the client device 203 to access the computing resource(s). In some embodiments, if the validation system 200 needs to validate the digital token 210A, then the validation system 200 may search for digital tokens 210A in the token-holding data structure 208. For example, the validation system 200 may search for particular assets in this wallet based on the assets that need to validated. If there is NFT Collection A, NFT Collection B, and NFT Collection C but the validation system 200 only needs to validate the ownership and attributes for someone holding an NFT from NFT Collection C, then the validation system 200 may search for the NFT in the NFT Collection C.

In STEP 306, the validation system 200 may parse the digital tokens 210A-210B to identify the attributes 212A-212D. In some embodiments, the validation system 200 may receive a list of digital tokens 210A-210B to parse. In some embodiments, the list includes the digital tokens 210A-210B that were searched. For example, the validation system 200 may include a list of NFTs that are to be parsed to validate the metadata. The metadata may be in a JSON format, base64 format, or any other format that may be parsed.

In some embodiments, the validation system 200 may identify structures (e.g., ERC721 or 1155) of the digital tokens 210A-210B. In some embodiments, the validation system 200 may identify attributes 212A-212D such as metadata, name, or media (e.g., Image/Animation) of the digital tokens 210A-210B. For example, the validation system 200 may search for attributes to identify whether the user has any NFTs with a Red Hat. In some embodiments, the validation system 200 may identify attributes 212A-212D such as traits of the one or more digital tokens 210A-210B. In some embodiments, the validation system 200 may identify attributes 212A-212D such as a trait type or a trait value of the digital tokens 210A-210B. In some embodiments, the validation system 200 may identify derivates of the one or more metadata attributes 212A-212D, which may include rarity, hair color, a presence, type or color of hats, identifiers (e.g., of people, places, landmarks, etc.), and amounts (e.g., number of tokens, monetary equivalence, data size, etc.). For example, the validation system 200 may parse and analyze each NFT to search for attributes for the trait type of "Hat" and the trait value of "Red" to identify NFTs with a Red Hat. This may be an example of an NFT following the ERC721 or ERC1155 NFT format.

In some embodiments, the trait(s) may be derived using human annotated labels and/or machine learning based classification of imagery, audio and/or video. For example, the validation system 200 may apply one or more trait classification machine learning models to an image, video and/or video frame, or to an audio signal or segment associated with the digital tokens 210A-210B. In some embodiments, the one or more trait classification machine learning models may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) define Neural Network architecture/model,
  ii) transfer the input data to the exemplary neural network model,
  iii) train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the digital tokens 210A-210B may be tagged, e.g., in metadata, with traits or descriptors. In some embodiments, the digital tokens 210A-210B may include text-based content. Accordingly, in some embodiments, the verification engine 200 may derive the traits based at least in part on textual analysis, keyword search and/or natural language processing of the digital tokens 210A-210B.

In some embodiments, the validation system 200 may identify a number of attributes in the digital tokens 210A-210B. In some embodiments, the validation system 200 may compare the number of attributes to a threshold number to identify if any of the digital tokens 210A-210B include a number of attributes satisfying the threshold. For example, an NFT might have varying amounts of attributes and the validation system 200 may provide access to computing resources if the NFT has over a threshold number of attributes. The validation system 200 may analyze each NFT and count the number of attributes to identify if they satisfy the threshold. In some embodiments, the validation system 200 may receive the threshold number of attributes.

In some embodiments, the validation system 200 may identify a frequency of the digital tokens 210A-210B. For example, the validation system 200 may identify NFTs based on their rarity. The validation system 200 may analyze the number of similar NFTs and compare the frequency to a threshold. In some embodiments, the validation system 200 may receive the threshold number of rarity. For example, the validation system 200 may identify NFTs that are in the top 10% of rarity.

In some embodiments, the validation system 200 may identify a number of the digital tokens 210A-210B in the token-holding data structure 208. The validation system 200 may analyze the number of NFTs and compare the number to a threshold. In some embodiments, the validation system 200 may receive the threshold number. For example, the validation system 200 may identify if a wallet has at least 2 NFTs.

In STEP 308, the validation system 200 may assign access to computing resources based on the identified attributes 212A-212D. For example, an administrator may provide access to computing resources based on the NFTs in the wallet having attributes that satisfy criteria (e.g., threshold). The administrator may have video classes that they would like to provide to owners of at least 2 NFTs. The administrator may use the validation system 200 to determine if a given wallet address has at least 2 NFTs. If the validation system 200 identifies that the wallet has at least 2 NFTs, the validation system 200 may provide access to the video classes. If the validation system 200 identifies that the wallet does not have at least 2 NFTs, then the validation system 200 may decline to authenticate the classes or provide access to the video classes.

In some embodiments, the validation system 200 may organize the one or more digital tokens 210A-210B based on the attributes 212A-212D. In some embodiments, the validation system 200 may assign access to users of the client device 203 based on the attributes 212A-212D satisfying the criteria. In some embodiments, the validation system 200 may provide access to computing resources based on the attributes 212A-212D. In some embodiments, the validation system 200 may provide access to computing resources such as online classes, computing roles with channel access, or future access to the network 204. In some embodiments, the validation system 200 may assign data structures to the client device 203 based on the attributes 212A-212D. In some embodiments, the validation system 200 may assign data structures to the client device 203 of a user considered to be an "elite citizen." In some embodiments, the validation system 200 may assign, to the client device 203 assigned the data structure, private access to communication channels that other users or owners of the digital tokens 210A-210B do not have access.

In some embodiments, the validation system 200 may identify changes to the token-holding data structure 208. In some embodiments, the validation system 200 may identify if the attributes 212A-212D indicate that the digital tokens 210A-210B fail to satisfy a criteria. For example, the validation system 200 may identify if the user removes their NFTs and no longer meets the threshold number of NFTs. This may be possible because the validation system 200 may constantly monitor the blockchain for transactions to obtain the most up to date asset balances for all wallets in the system. In some embodiments, the validation system 200 may identify transactions in the token-holding data structure 208 (because it is linked). The validation system 200 may analyze the token-holding data structure 208 based on the transactions. For example, the validation system 200 may identify that the digital token 210A was removed from the token-holding data structure 208. The validation system 200 may modify access based on the changes to the token-holding data structure 208. In some embodiments, the validation system 200 may remove access to computing resources. For example, the validation system 200 may automatically revoke access to the video classes.

Figure 4:
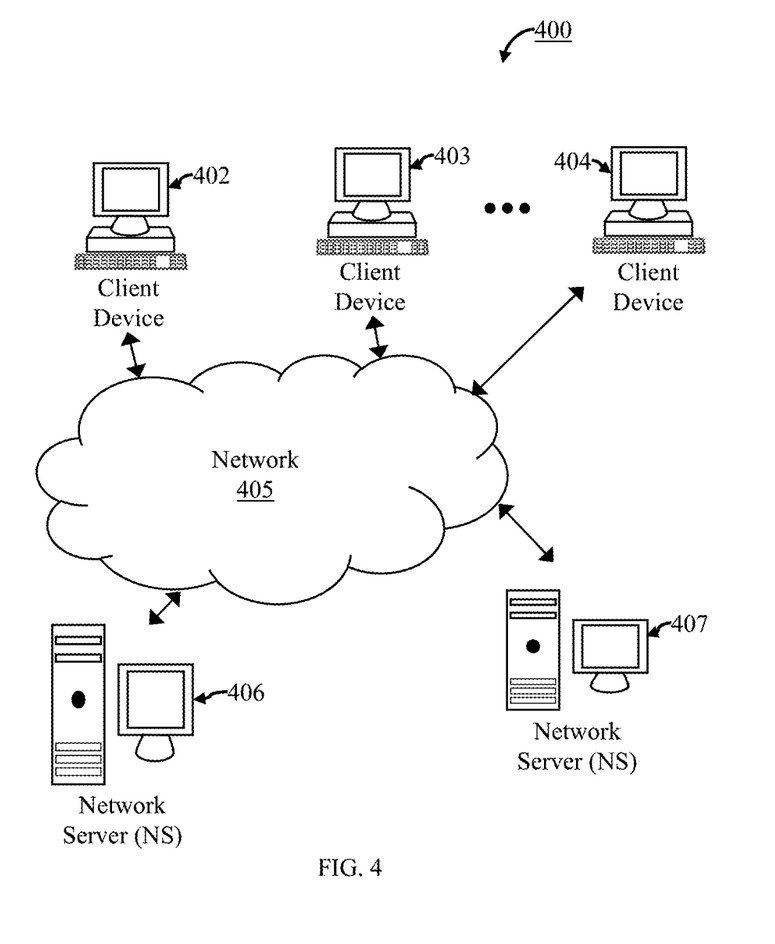

FIG. 4 depicts a block diagram of a computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of clients and concurrent transactions, as detailed herein. In some embodiments, the exemplary computer-based system and platform 400 may be based on a scalable computer and network architecture that incorporates various strategies for assessing the data, caching, searching, and/or database connection pooling. An example of the scalable architecture is an architecture that is capable of operating multiple servers.

In some embodiments, referring to FIG. 4, member computing device 402, member computing device 403 through member computing device 404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), AR glasses/lens, and/or any other device that is equipped to communicate over a wired and/or wireless communication medium (e.g., NFC, RFID, NBIOT, 3G, 4G, 5G, GSM, GPRS, Wi-Fi, WiMAX, CDMA, satellite, Bluetooth, ZigBee, etc.).

In some embodiments, one or more member devices within member devices 402-404 may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as Hypertext Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, Python .Net, QT, C, C++ and/or other suitable programming language. In some embodiments, one or more member devices within member devices 402-404 may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based, at least in part, on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as, but not limited to: NFC, RFID, Narrow Band Internet of Things (NBIOT), ZigBee, 3G, 4G, 5G, GSM, GPRS, Wi-Fi, WiMAX, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa. In some embodiments, one or more of the exemplary servers 406 and 407 may be specifically programmed to perform, in a non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

In some embodiments, the present disclosure includes a method that includes establishing, by a processor, a connection with a distributed data network. The distributed data network may be configured to maintain a plurality of token-holding data structures storing a plurality of digital tokens maintained by the plurality of token-holding data structures for a plurality of users utilizing a plurality of client devices. The method may include accessing, by the processor, one or more first digital tokens from the plurality of digital tokens. The one or more first digital tokens may be maintained by a first token-holding data structure associated with a first user of the plurality of users. The first user may utilize a first client device to access the distributed data network. The method may include parsing, by the processor, the plurality of digital tokens to identify one or more attributes of the one or more first digital tokens. The method may include assigning, by the processor, access to one or more computing resources to the first client device based on the one or more attributes.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the presently disclosed embodiments. Embodiment examples are described as follows with reference to the figures. Identical, similar, or identically acting elements in the various figures are identified with identical reference numbers and a repeated description of these elements is omitted in part to avoid redundancies.

From the foregoing description, it will be apparent that variations and modifications may be made to the embodiments of the present disclosure to adopt it to various usages and conditions. Such embodiments are also within the scope of the following claims.

The recitation of a listing of elements in any definition of a variable herein includes definitions of that variable as any single element or combination (or sub-combination) of listed elements. The recitation of an embodiment herein includes that embodiment as any single embodiment or in combination with any other embodiments or portions thereof.

It is understood that at least one aspect/functionality of various embodiments described herein may be performed in real-time and/or dynamically. As used herein, the term "real-time" is directed to an event/action that may occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation may be used in guiding the physical process.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "component," "module," "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may refer to a person who receives data provided by the data or service provider over the Internet in a browser session, or may refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising: establishing, by at least one processor, a connection with a distributed data network; wherein the distributed data network comprises a plurality of client devices associated with a plurality of users; wherein the plurality of client devices are associated with a plurality of token-holding data structures storing a plurality of digital tokens for the plurality of users in accordance with at least one data schema; accessing, by the at least one processor, a first token-holding data structure associated with a first user of the plurality of users, the first token-holding data structure storing one or more first digital tokens from the plurality of digital tokens; wherein the first user utilizes a first client device to access the distributed data network; parsing, by the at least one processor, the one or more first digital tokens to identify one or more attributes of the one or more first digital tokens; and determining, by the at least one processor, at least one access permission criteria provided by at least one computing resource; wherein the at least one access permission criteria comprises at least one required attribute to be validated for access to the at least one computing resource; assigning, by the at least one processor, based at least in part on the one or more attributes meeting the at least one access permission criteria, access to one or more computing resources to the first client device to enable the first user to access the one or more computing resources via the first client device.

Clause 2. The method of clause 1, further comprising: requesting, by the processor, from a first token-holding data structure provider associated with the first token-holding data structure, authentication information for access to the first token-holding data structure; receiving, by the processor, from the first token-holding data structure provider, authentication information comprising the at least one first token-holding data structure attribute of the first token-holding data structure; authenticating, by the processor, the first user as an owner of the first token-holding data structure based on the authentication information; and establishing, by the processor, a link to the first token-holding data structure based on the authenticating to enable the accessing of the accessing, by the at least one processor, of the first token-holding data structure.

Clause 3. The method of clause 2, wherein the link comprises a persistent authentication with the first token-holding data structure to enable access to the first token-holding data structure without another authentication message.

Clause 4. The method of clause 1, wherein the first token-holding data structure comprises a first blockchain wallet.

Clause 5. The method of clause 1, wherein the at least one access permission criteria comprises a threshold number of digital tokens; and wherein the one or more attributes of the one or more first digital tokens comprises a number of the one or more first digital tokens.

Clause 6. The method of clause 1, further comprising: determining, by the at least one processor, a media type of the one or more first digital tokens; wherein the at least one access permission criteria comprises a required media type of digital tokens.

Clause 7. The method of clause 1, further comprising: accessing, by the at least one processor, at least one image associated with the one or more first digital tokens; determining, by the at least one processor, at least one derived trait of content of the at least one image; and identifying, by the at least one processor, the one or more attributes as the at least one derived trait.

Clause 8. The method of clause 7, wherein the at least one derived trait comprises at least one trait of a person captured in the at least one image.

Clause 9. The method of clause 8, wherein the at least one trait of the person comprises at least one of: rarity, hair color, a presence of a hat, or an identifier of the person, Clause 10. The method of clause 1, wherein the one or more attributes comprises an amount of the one or more first digital tokens.

Clause 11. A system comprising: at least one processor that, upon execution of software instructions, is configured to: establish a connection with a distributed data network; wherein the distributed data network comprises a plurality of client devices associated with a plurality of users; wherein the plurality of client devices are associated with a plurality of token-holding data structures storing a plurality of digital tokens for the plurality of users in accordance with at least one data schema; access a first token-holding data structure associated with a first user of the plurality of users, the first token-holding data structure storing one or more first digital tokens from the plurality of digital tokens; wherein the first user utilizes a first client device to access the distributed data network; parse the one or more first digital tokens to identify one or more attributes of the one or more first digital tokens; and determine at least one access permission criteria provided by at least one computing resource; wherein the at least one access permission criteria comprises at least one required attribute to be validated for access to the at least one computing resource; assign based at least in part on the one or more attributes meeting the at least one access permission criteria, access to one or more computing resources to the first client device to enable the first user to access the one or more computing resources via the first client device.

Clause 12. The system of clause 11, wherein the at least one processor is further configured to: requesting, by the processor, from a first token-holding data structure provider associated with the first token-holding data structure, authentication information for access to the first token-holding data structure; receiving, by the processor, from the first token-holding data structure provider, authentication information comprising the at least one first token-holding data structure attribute of the first token-holding data structure; authenticating, by the processor, the first user as an owner of the first token-holding data structure based on the authentication information; and establishing, by the processor, a link to the first token-holding data structure based on the authenticating to enable the accessing of the access of the first token-holding data structure.

Clause 13. The system of clause 12, wherein the link comprises a persistent authentication with the first token-holding data structure to enable access to the first token-holding data structure without another authentication message.

Clause 14. The system of clause 11, wherein the first token-holding data structure comprises a first blockchain wallet.

Clause 15. The system of clause 11, wherein the at least one access permission criteria comprises a threshold number of digital tokens; and wherein the one or more attributes of the one or more first digital tokens comprises a number of the one or more first digital tokens.

Clause 16. The system of clause 11, wherein the at least one processor is further configured to: determine a media type of the one or more first digital tokens; wherein the at least one access permission criteria comprises a required media type of digital tokens.

Clause 17. The system of clause 11, wherein the at least one processor is further configured to: access at least one image associated with the one or more first digital tokens; determine at least one derived trait of content of the at least one image; and identify the one or more attributes as the at least one derived trait.

Clause 18. The system of clause 17, wherein the at least one derived trait comprises at least one trait of a person captured in the at least one image.

Clause 19. The system of clause 18, wherein the at least one trait of the person comprises at least one of: rarity, hair color, a presence of a hat, or an identifier of the person, Clause 20. The system of clause 11, wherein the one or more attributes comprises an amount of the one or more first digital tokens.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein may be utilized in any combination with each other. Further still, the various steps may be carried out in any desired order (and any desired steps may be added and/or any desired steps may be eliminated).

What is claimed is:

1. A method comprising:
    establishing, by at least one processor, a connection with a distributed data network;
        wherein the distributed data network comprises a plurality of client devices associated with a plurality of users;
        wherein the plurality of client devices are associated with a plurality of token-holding data structures storing a plurality of digital tokens for the plurality of users in accordance with at least one data schema;
    accessing, by the at least one processor, a first token-holding data structure associated with a first user of the plurality of users, the first token-holding data structure storing one or more first digital tokens from the plurality of digital tokens;
        wherein the first user utilizes a first client device to access the distributed data network;
    accessing, by the at least one processor, at least one content item associated with the one or more first digital tokens;
    determining, by the at least one processor, at least one derived trait of the at least one content item; and
    identifying, by the at least one processor, one or more attributes of the one or more first digital tokens based at least in part on the at least one derived trait;
    determining, by the at least one processor, at least one access permission criteria provided by at least one computing resource;
        wherein the at least one access permission criteria comprises at least one required attribute to be validated for access to the at least one computing resource; and
    assigning, by the at least one processor, based at least in part on the one or more attributes meeting the at least one access permission criteria, access to one or more computing resources to the first client device to enable the first user to access the one or more computing resources via the first client device.

2. The method of claim 1, further comprising:
    requesting, by the processor, from a first token-holding data structure provider associated with the first token-holding data structure, authentication information for access to the first token-holding data structure;
    receiving, by the processor, from the first token-holding data structure provider, authentication information comprising the at least one first token-holding data structure attribute of the first token-holding data structure;

authenticating, by the processor, the first user as an owner of the first token-holding data structure based on the authentication information; and establishing, by the processor, a link to the first token-holding data structure based on the authenticating to enable the accessing of the accessing, by the at least one processor, of the first token-holding data structure.

3. The method of claim 2, wherein the link comprises a persistent authentication with the first token-holding data structure to enable access to the first token-holding data structure without another authentication message.

4. The method of claim 1, wherein the first token-holding data structure comprises a first blockchain wallet.

5. The method of claim 1, wherein the at least one access permission criteria comprises a threshold number of digital tokens; and
wherein the one or more attributes of the one or more first digital tokens comprises a number of the one or more first digital tokens.

6. The method of claim 1, further comprising:
determining, by the at least one processor, a media type of the one or more first digital tokens;
wherein the at least one access permission criteria comprises a required media type of digital tokens.

7. The method of claim 1, wherein the at least one derived trait comprises at least one trait of a person captured in the at least one content item.

8. The method of claim 1, wherein the one or more attributes comprise at least one of:
rarity,
color,
an article of clothing,
location of an event,
time of the event,
artist name performing at the event, or
ticket tier associated with the event.

9. The method of claim 1, wherein the one or more attributes comprises an amount of the one or more first digital tokens.

10. A system comprising:
at least one processor that, upon execution of software instructions, is configured to:
establish a connection with a distributed data network;
wherein the distributed data network comprises a plurality of client devices associated with a plurality of users;
wherein the plurality of client devices are associated with a plurality of token-holding data structures storing a plurality of digital tokens for the plurality of users in accordance with at least one data schema;
access a first token-holding data structure associated with a first user of the plurality of users, the first token-holding data structure storing one or more first digital tokens from the plurality of digital tokens;
wherein the first user utilizes a first client device to access the distributed data network;
access at least one content item associated with the one or more first digital tokens;
determine at least one derived trait of the at least one content item; and
identify one or more attributes of the one or more first digital tokens based at least in part on the at least one derived trait; and determine at least one access permission criteria provided by at least one computing resource;
wherein the at least one access permission criteria comprises at least one required attribute to be validated for access to the at least one computing resource;
assign based at least in part on the one or more attributes meeting the at least one access permission criteria, access to one or more computing resources to the first client device to enable the first user to access the one or more computing resources via the first client device.

11. The system of claim 10, wherein the at least one processor is further configured to:
requesting, by the processor, from a first token-holding data structure provider associated with the first token-holding data structure, authentication information for access to the first token-holding data structure;
receiving, by the processor, from the first token-holding data structure provider, authentication information comprising the at least one first token-holding data structure attribute of the first token-holding data structure;
authenticating, by the processor, the first user as an owner of the first token-holding data structure based on the authentication information; and
establishing, by the processor, a link to the first token-holding data structure based on the authenticating to enable the accessing of the access of the first token-holding data structure.

12. The system of claim 11, wherein the link comprises a persistent authentication with the first token-holding data structure to enable access to the first token-holding data structure without another authentication message.

13. The system of claim 10, wherein the first token-holding data structure comprises a first blockchain wallet.

14. The system of claim 10, wherein the at least one access permission criteria comprises a threshold number of digital tokens; and
wherein the one or more attributes of the one or more first digital tokens comprises a number of the one or more first digital tokens.

15. The system of claim 10, wherein the at least one processor is further configured to:
determine a media type of the one or more first digital tokens;
wherein the at least one access permission criteria comprises a required media type of digital tokens.

16. The system of claim 10, wherein the at least one derived trait comprises at least one trait of a person captured in the at least one content item.

17. The system of claim 16, wherein the one or more attributes comprise at least one of:
rarity,
color,
an article of clothing,
location of an event,
time of the event,
artist name performing at the event, or
ticket tier associated with the event.

18. The system of claim 10, wherein the one or more attributes comprises an amount of the one or more first digital tokens.

* * * * *